United States Patent [19]
Baker

[11] Patent Number: 5,133,566
[45] Date of Patent: Jul. 28, 1992

[54] COLLET ACTIVATED SPINDLE WORK STOP

[76] Inventor: Douglas F. Baker, 766 - 55th St., Brooklyn, N.Y. 11220

[21] Appl. No.: 804,128

[22] Filed: Dec. 6, 1991

[51] Int. Cl.$^5$ .............................................. B23B 31/20
[52] U.S. Cl. ...................................... 279/156; 82/155; 279/2.01; 279/46.4
[58] Field of Search ............................. 279/2.01–2.04, 279/46.4, 156, 1.5, 2 R, 46 R, 46.1–46.3, 127, 137; 82/155

[56] References Cited

U.S. PATENT DOCUMENTS

| | | | |
|---|---|---|---|
| 2,396,504 | 3/1946 | Grey | 279/156 |
| 2,398,278 | 4/1946 | Bailey | 279/156 X |
| 2,644,929 | 7/1953 | Kumpf | 279/127 X |
| 2,756,059 | 7/1956 | Knapp | 279/156 |
| 3,615,101 | 10/1971 | Oliver | 279/156 |
| 4,955,622 | 9/1990 | Peterson | 279/156 |

Primary Examiner—Steven C. Bishop
Attorney, Agent, or Firm—Goodman & Teitelbaum

[57] ABSTRACT

A spindle work stop including a collet having an externally threaded rear end portion with an external groove extending longitudinally therethrough and a slotted outwardly tapered front end portion, where an opening extends longitudinally through the collet, a rod inserted in the opening of the collet, a nut threadedly engaged on the threaded rear end portion of the collet, a sleeve member receiving the collet therein, and a lock member positioned between the nut and the sleeve member being disposed in the groove of the collet. The assembled work stop is inserted into an open end of a spindle of a lathe, and the nut is tightened to draw the collet rearwardly into the sleeve member while the lock member prevents the collet from rotating, so that the tapered front end portion of the collet is wedged against the sleeve member to squeeze the front end portion of the collet against the rod to secure the rod therein, and also to expand the sleeve member against the inner walls of the spindle to secure the sleeve member and the collet relative to the spindle and to each other. The locking member and the sleeve member can be modified to include mating tapered surfaces to provide a wedge engagement therebetween to expand the sleeve member against the inner walls of the spindle at the open end of the spindle. The sleeve member can also be modified so that the locking member forms a part thereof by providing a rib on an internal wall of the sleeve member at a rear portion thereof. Preferably, the sleeve member is fabricated from an elastomeric material.

20 Claims, 2 Drawing Sheets

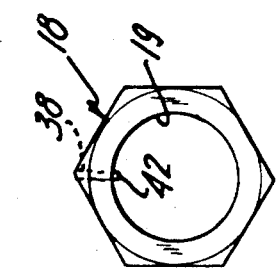
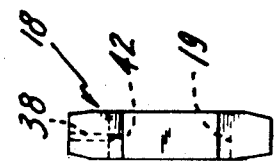
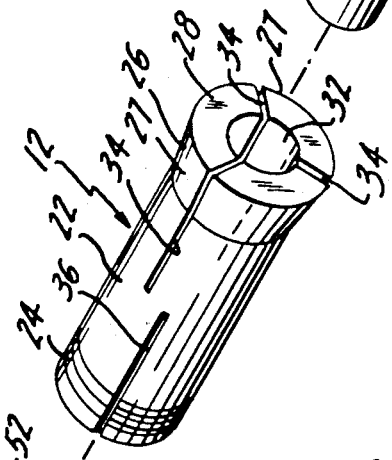
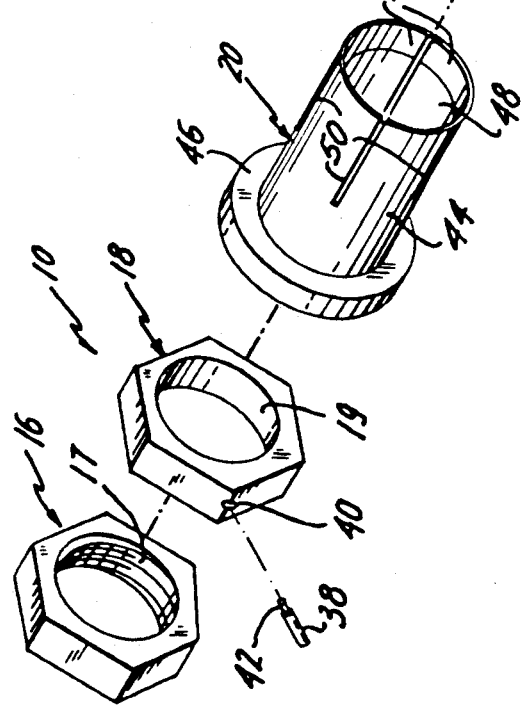
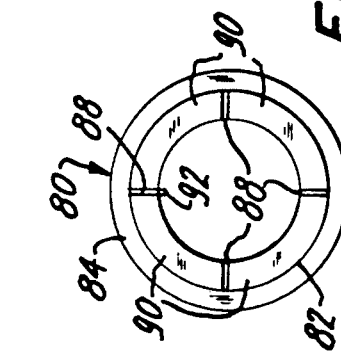
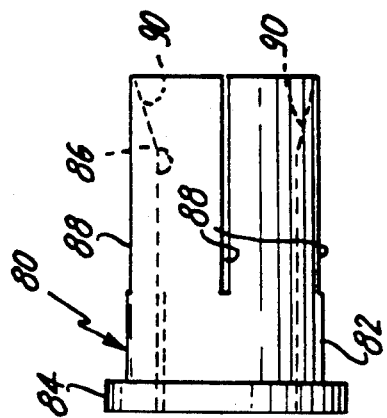

COLLET ACTIVATED SPINDLE WORK STOP

BACKGROUND OF THE INVENTION

The invention relates to engine lathes, and more particularly, to a work stop that fits into a spindle of an engine lathe or any other similar hollow spindle machine.

Spindle work stops are well known in the art. Heretofore, spindle work stops have been made by individual machinists in order to meet the construction requirements for each machine. Some of the prior art devices include parts held in place with set screws, tapered plugs and "spiders" which fit between the openings of the chuck jaws of the machine.

U.S. Pat. Nos. 2,398,278 and 4,955,622 disclose work stops in which the stop rod is held in place by a threaded screw. Prior art work stops are also disclosed in U.S. Pat. Nos. 1,014,051, 3,115,798, 3,385,607, 3,615,101, 3,876,214 and 4,702,484, indicating that the work stops can have many different types of construction as shown in these patents.

It is noted, that there is no standard commercial tool that can be used to secure the prior art work stops within the spindle of the lathe, where in many cases set screws are used to clamp the work stops onto the spindle. In these cases, the set screws can distort or damage the spindle, and also the use of such set screws often requires the removal of the back cover or guard of the lathe in the installation thereof.

Furthermore, the prior art spindle work stops require that only one size material can be fitted to the stop. Additionally, prior art work stops are too large and heavy to store in a conventional tool box. Also, prior art work stops are difficult to adapt to fit into latches having different size spindles, normally take a long time to set up, are expensive to manufacture and therefore must be sold at a high price.

Accordingly, there is presently a need for a spindle work stop that can be secured with a standard commercial tool, that reduces the amount of manufactured parts, that does not use any set screws in the construction thereof, that can be fitted with different size material, that can be easily stored in a conventional tool box, that can be easily adapted to fit into lathes having different size spindles, that can be set up quickly, that can be adjusted without being removed from the machine, that can be adjusted to a desired position with a work piece in the machine, that are inexpensive to manufacture and therefore can be sold at a reasonable price.

SUMMARY OF THE INVENTION

It is accordingly an object of the present invention to provide a collet activated spindle work stop which avoids the problems of the prior art devices.

Another object is to provide a rigid work stop for positioning work pieces inside of a spindle of a lathe or similar hollow spindle machine, where the work stop can be easily moved axially to any desired position therein, and the work stop can also be used to support and secure long material that is being machined in such a manner that the work stop prevents the long material from "whipping" inside the spindle.

A further object is to provide a work stop that uses a conventional machine shop tool, such as a collet that positions the work stop inside of the spindle in such a manner that the collet is locked uniformly around the inside surface of the spindle, where any size material can be used that corresponds with the collet set, and no modification of the machine is required.

Still another object of the present invention is to provide a work stop that can be quickly installed in that it requires only the tightening of one nut to secure the work stop within the spindle, the work stop being both very light and small in size which permits the storage thereof in most conventional tool boxes.

Another object of the present invention is to provide a work stop that can be easily and economically manufactured at an effective cost to be reasonably priced, where the work stop does not harm the spindle, and where the work stop can be easily released from the spindle when unlocked.

Yet another object of the present invention is to provide a work stop which includes a sleeve member for the installation thereof which does not require the removal of any guards or covers of the lathe, and does not require the use of any set screws, in the installation thereof which could damage the spindle, where the sleeve member is adapted to receive a sleeve to fit into larger spindles.

Briefly, in accordance with the present invention, there is provided a spindle work stop including a collet having an externally threaded rear end portion with an external groove extending longitudinally therethrough and a slotted outwardly tapered front end portion, where an opening extends longitudinally through the collet, a rod inserted in the opening of the collet, a nut threadedly engaged on the threaded rear end portion of the collet, sleeve means receiving the collet therein, and locking means positioned between the nut and the sleeve means being disposed in the groove of the collet. The assembled work stop is inserted into an open end of a spindle of a lathe, and the nut is tightened to draw the collet rearwardly into the sleeve means while the locking means prevents the collet from rotating, so that the tapered front end portion of the collet is wedged against the sleeve means to squeeze the front end portion of the collet against the rod to secure the rod therein, and also to expand the sleeve means against the inner walls of the spindle to secure the sleeve means and the collet relative to the spindle and to each other. The locking means and the sleeve means can be modified to include mating tapered surfaces to provide a wedge engagement therebetween to expand the sleeve means against the inner walls of the spindle at the open end of the spindle. The sleeve means can also be modified so that the locking means forms a part thereof by providing a rib on an internal wall of the sleeve means at a rear portion thereof. Preferably, the sleeve means is fabricated from an elastomeric material.

BRIEF DESCRIPTION OF THE DRAWINGS

With the above and additional objects and advantages in view, as will hereinafter appear, this invention comprises the devices, combinations and arrangements of the parts hereinafter described by way of example and illustrated in the accompanying drawings of a preferred embodiment in which:

FIG. 1 is an exploded perspective view of the parts of a collet activated spindle work stop in accordance with the present invention;

FIG. 2 is a side elevational view of the lock member shown in FIG. 1;

FIG. 3 is a front elevational view of the lock member shown in FIG. 2;

FIG. 10 is a side elevational view of a further modified sleeve member; and

FIG. 11 is a front elevational view of the further modified sleeve member of FIG. 10.

In the various figures of the drawings, like reference characters designate like parts.

DESCRIPTION OF THE PREFERRED EMBODIMENT

Figure 4:
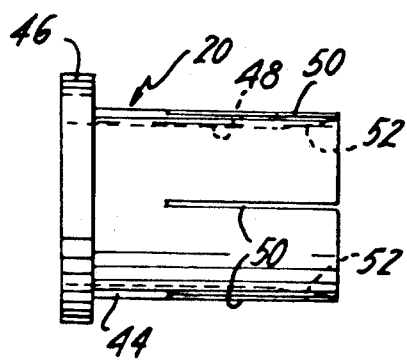
FIG. 4 is a side elevational view of the sleeve member shown in FIG. 1.

Referring now to the drawings, FIG. 1 shows the parts of a collet activated spindle work stop 10 in accordance with the present invention, including a collet 12, a rod 14, a nut 16, a lock member 18 and a sleeve member 20, which are assembled together as set forth below.

The collet 12 is a well known, commercially available part fabricated from a suitable material, such as metal, preferably being type No. 5C. The collet 12 includes an elongated cylindrical hollow body member 22 having an externally threaded rear end portion 24 and a tapered front end portion 26 which tapers outwardly towards the front end 28 thereof. An enlarged hole 30 extends inwardly from the threaded end portion 24 of the collet 12, the enlarged hole 30 being in communication with a smaller centrally located hole 32 extending inwardly from the front end portion 26 thereof so that an opening is provided longitudinally through the collet 12, see FIG. 6. Slots 34 extend transversely through the body member 22 and the tapered front end portion 26 to be in communication with the holes 30, 32 to divide the front end portion 26 into separated compressable portions 27. Additionally, a longitudinally extending groove 36 is provided externally in the collet 12, extending from the rear end thereof through the threaded rear end portion 24 and into the body member 22.

The rod 14 is also commercially available and is fabricated from any suitable material, such as metal. The rod 14 can be made in any desired length and has an outer diameter substantially equal to the diameter of the hole 32 in the collet 12 so that the rod 14 can be inserted into the hole 32 of the collet 12 in a sliding engagement.

The nut 16 can also be a commercially available part. However, the nut 16 is preferably formed from a 1¾ hex which is bored by 1.190 inches and tapped to a 1.245-20 inch thread, class 2B fit, so that the threaded bore 17 can be threadably engaged on the threaded rear end portion 24 of the collet 12. Preferably, the nut 16 is ½ inches wide and has a 1/32 inch×15° chamfer on both sides thereof. Preferably the nut 16 is fabricated from a cold rolled steel, but any suitable material could be used, such as tool steel, brass or bronze. It is noted, that the hex stock used for the nut 16 could be replaced with round stock provided with slots or holes machined therein to receive a spanner wrench on the side or circumference thereof.

It is noted, that any type or size of rear drawn collet can be used in the present invention, with a corresponding nut or bolt for the collet being used, where the above mentioned collet 12 and nut 16 have been described by way of example.

As shown in FIGS. 1, 2 and 3, the lock member 18 is very similar to the above mentioned nut 16 except the lock member 18 is not internally threaded. Accordingly, the lock member 18 is also preferably formed from a 1¾ hex which is bored by 1.260 inches to have a slightly larger opening or bore 19 therethrough than the threaded bore 17 of the nut 16. Preferably, the lock member 18 is also ½ inches wide and has 1/32 inch by 15° chamfer on both sides thereof. Here again, the lock member 18 is preferably fabricated from a cold rolled steel, but any suitable material could be used, such as tool steel, brass or bronze. Furthermore, as mentioned above, the hex stock used for the lock member 18 could be replaced with round stock.

The lock member 18 includes a pin 38 which is force fitted into a hole 40 extending through the side of the lock member 18 to be in communication with the bore 19 thereof. Preferably, the hole 40 extends from a corner of the side of the lock member 18. The pin 38 is preferably a ⅛ inch diameter dowel pin 38 that is pressed into a 0.124 inch diameter hole 40. The pin 38 has a slightly reduced diameter end portion 42 which extends 0.057 inch into the bore 19 of the lock member 18 to be received in the groove 36 of the collet 12, as will be explained below, where preferably the end of the reduced diameter end portion 42 is positioned 0.005 inch above the bottom of the groove 36 of the collet 12 when positioned therein.

It is noted, that the lock member 18 could also be constructed in the form of a washer that is made to fit around the circumference of the collet 12, the washer being provided with a projecting portion which is received in the groove 36 of the collet 12, thereby eliminating the need for the above mentioned pin 38. Preferably, the washer would also be provided with slots on its circumference to accomodate a spanner wrench.

The lock member 18 is used to prevent the collet 12 from turning or rotating relative to the nut 16 while tightening or loosening the nut 16. Accordingly, if the collet 12 is prevented from turning or rotating inside the sleeve member 20 by suitable means while tightening or loosening the nut 16, then the lock member 18 would not be required and could be eliminated. For example, if the sleeve member 20 was provided with a pin, key, rib or the like, to be received in the groove 36 of the collet 12, as will be explained below with reference to FIGS. 10 and 11, then the lock member 18 would not be required.

Figure 5:
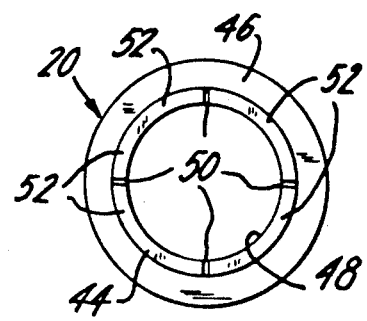
FIG. 5 is a front elevational view of the sleeve member shown in FIG. 4.

As shown in FIGS. 1, 4 and 5, the sleeve member 20 includes an elongated cylindrical hollow body member 44 having an enlarged flange 46 on the rear end portion thereof with an opening 48 extending longitudinally therethrough. The front end portion of the sleeve member 20 has one or more slots 50 provided therein, the slots 50 extending longitudinally through the front end of the sleeve member 20 and being transversely extended into communication with the opening 48 to provide flexibility for the sleeve body member 44 to expand or contract, as described below. Preferably, as shown in the drawings, four slots 50 are provided equally spaced around the circumference of the sleeve member 20. It is noted, that the inner diameter of the front end portion of the sleeve member 20 is tapered outwardly towards the front end thereof to increase the diameter of the opening 20 as it approaches the front end so that the tapered walls 52 of the opening 48, which are separated apart by the slots 50, can coact with the tapered front end portion 26 of the collet 12 in a wedging engagement, as set forth below.

Preferably, the outer diameter of the sleeve flange 46 is 2 inches and is ¼ inch wide, with the inner diameter of the opening 48 therethrough being 1.260 inches. The sleeve body member 44 has an outer diameter of 1.535 inches and a length of 2.062 inches, so that the total length of the sleeve member 20 is 2.312 inches. The inner diameter of a major portion of the opening 48 through the sleeve body member 44 is 1.260 inches, the same as the inner diameter of the flange 46, where the inner diameter of the front portion of the sleeve body member 44 is tapered at approximately 10° for approximately ⅞ inches from the front end of the sleeve member 20 so that the inner diameter of the tapered walls 52 of the opening 48 has a maximum inner diameter of 1.480 inches at the front end of the sleeve member 20. The slots 50 in the sleeve body member 44 are 1/16 inches wide and have a longitudinal length of 1 7/16 inches from the front end of the sleeve member 20.

Though the sleeve member 20 can be fabricated from brass, aluminum, tool steel, phenolic, powdered steel, cast iron, stainless steel and the like, when considering the manufacturing and the performance thereof, for best results the sleeve member 20 is preferably fabricated from an elastomeric material such as an acetal plastic, commercially known by the trademark Delrin.

Figure 6:
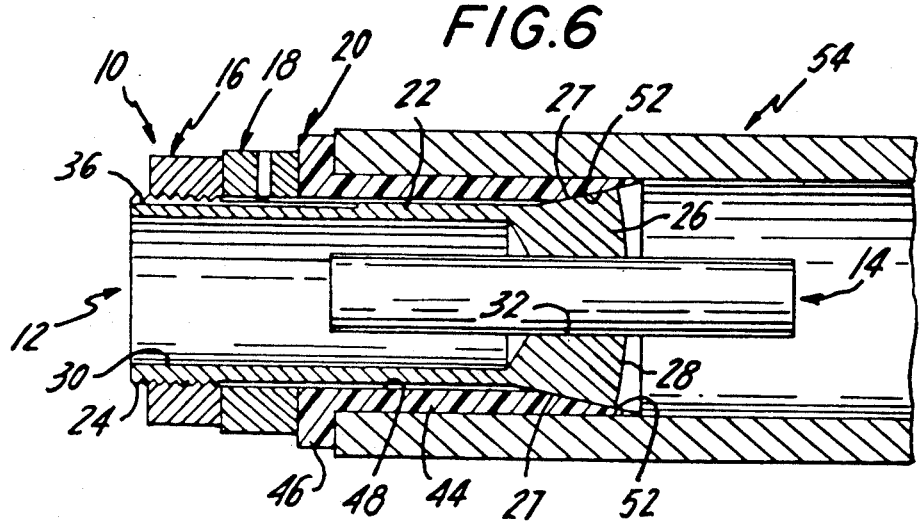
FIG. 6 is a fragmented sectional view showing the collet activated spindle work stop engaged within the spindle of a lathe.

FIG. 6 shows the spindle work stop 10 in use, being engaged within a conventional spindle 54 of a lathe. Before engaging the spindle work stop 10 in the spindle 54, the collet 12 is first inserted into the sleeve member 20 through the front end thereof. The lock member 18 is then slipped over the protruding rear end of the collet 12 so that the reduced end portion 42 of the pin 38, engaged in the lock member 18, is aligned in the groove 36 of the collet 12. The nut 16 is now threaded part way onto the threaded rear end portion 24 of the collet 12 to draw the collet 12 into the sleeve member 20 so that the tapered front end portion 26 of the collet 12 slightly touches the tapered walls 52 of the opening 48 of the sleeve member 20. After the above engagement, the rod 14 is positioned in the hole 32 in the front end portion 26 of the collet 12.

The assembled spindle work stop 10, as described above, is now inserted into the open end of the spindle 54. The nut 16 is then tightened on the threaded rear end portion 24 of the collet 12 until the spindle work stop 10 is secured within the spindle 54. Accordingly, when the nut 16 is being tightened, the nut 16 abuts against the lock member 18, so that the lock member 18 abuts against the sleeve flange 46, and the sleeve flange 46 abuts against the end of the spindle 54, so that the lock member 18 and the sleeve member 20 are held stationery relative to the spindle 54 when the nut 16 is being tightened. Thus, the pin 38 of the lock member 18 is also held stationary so that the reduced end portion 42 of the pin 38, which is engaged in the groove 36 of the collet 12, prevents the collet 12 from rotating when being drawn in by the tightening of the nut 16.

Furthermore, as the collet 12 is being drawn in by the tightening of the nut 16, the tapered front end portion 26 wedges against the tapered walls 52 of the sleeve opening 48 so that the front end portions 27 of the collet 12 are compressed together into engagement on the rod 14 to secure the rod 14 within the collet 12. Additionally, during this wedging engagement, the front end portion of the sleeve member 20 is expanded, due to the slots 50 therein, into engagement with the interior walls of the spindle 54 to provide a secure engagement therebetween. Thus it is seen, that the wedging engagement between the collet 12 and the sleeve member 20 not only secures the collet 12 to the sleeve member 20, but also secures the rod 14 within the collet 12, and secures the sleeve member 20 within the spindle 54 so that the rod 14, the collet 12, the sleeve member 20 and the spindle 54 are secured relative to each other in a fixed engagement.

Accordingly, as indicated above, the sleeve member 20 has a dual function, one function is to expand until the sleeve member 20 is secured against the interior walls of the spindle 54, and the second function is to provide a wedging action against the collet 12 to compress the collet 12 into a secured engagement with the rod 14.

The outside diameter of the sleeve flange 46 is larger than the inside diameter of the interior walls of the spindle 54 of the lathe or similar hollow spindle machine, where the sleeve flange 46 can be made any size larger as desired. However, it is recommended that the outside diameter of the sleeve flange 46 be as close to the outside diameter of the spindle 54 as possible merely for the sake of uniformity. The large outside diameter of the sleeve flange 46 prevents the sleeve member 20 from being drawn into the interior of the spindle 54 during the assembly, and thus positioning the sleeve flange 46 at the free end of the spindle 54. The outside diameter of the sleeve body member 44 is approximately 0.005 inches smaller than the inside diameter of the spindle 54 to provide a slip fit engagement therebetween. Accordingly, the outside diameter of the sleeve body member 44 expands approximately 0.040 inch when the collet 12 is drawn therein to provide for variations in the spindle size.

Accordingly, the split sleeve technique can be used to facilitate the use of the sleeve body member 44 in larger sized spindles, or the sleeve body member 44 can be sleeved to fit different larger sized spindles. Thus, the sleeve member 20 provides a highly reliable, light weight yet economical construction which can be readily used in a machine shop or tool room to reduce production time and set-up time.

Figure 7:
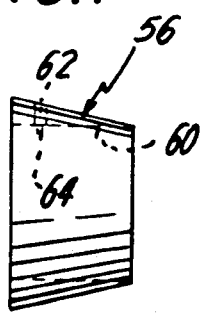
FIG. 7 is a side elevational view of a modified lock member.
Figure 8:
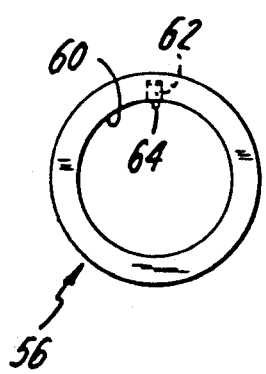
FIG. 8 is a front elevational view of the modified lock member of FIG. 7.
Figure 9:
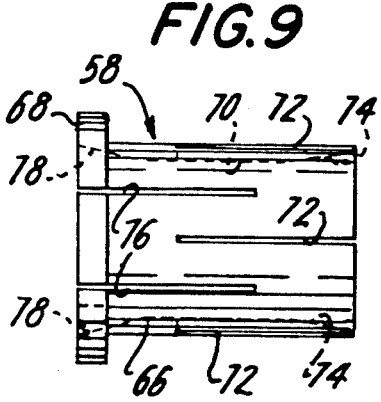
FIG. 9 is a side elevational view of a modified sleeve member.

FIGS. 7-9 show a modified lock member 56 and associated sleeve member 58. The lock member 56, which can be fabricated from any suitable material, such as metal, has a frustum-cone shaped body approximately 1 1/16 inches long with an opening 60 longitudinally therethrough, the opening 60 having the same sized diameter as the opening 19 of the above-mentioned lock member 18. The rear end of the lock member 56 has a 1.655 inch diameter which tapers inwardly towards the front end thereof which has a smaller 1.260 inch diameter. The lock member 56 also includes a pin 62, which is force-fit into a hole in the lock member 56 adjacent to the rear end thereof, having a slightly reduced diameter end portion 64 extending into the opening 60 of the lock member 56. The pin 62 is the same as the above mentioned pin 38, and functions in the same manner so that a further description thereof is not thought necessary.

The sleeve member 58 is similar to the above-mentioned sleeve member 20, including an elongated cylindrical hollow body member 66, an enlarged flange 68 on the rear end portion thereof, an opening 70 extending longitudinally therethrough, four slots 72 extending longitudinally through the front end thereof and being transversely extended into communication with the opening 70, and the inner diameter of the front end portion being tapered outwardly towards the front end thereof to increase the diameter of the opening 70 as it approaches the front end to provide internal tapered walls 74 in the front portion of the opening 70, where the sleeve member 58 is preferably fabricated from an elastomeric material such as an acetal plastic, commercially known by the trademark Delrin, as mentioned above. The dimensions of the above described parts of the sleeve member 58 are the same as the like parts of the above-mentioned sleeve member 20 so that no further description thereof is thought necessary.

However, the rear end portion of the sleeve member 58 has one or more slots 76 provided therein, the slots 76 extending longitudinally through the flange 68 and the rear end portion of the sleeve body member 66 and being transversely extended into communication with the opening 70 to provide flexibility for the rear end portion of the sleeve member 58 to expand and contract, as described below. Preferably, as shown in the drawings, four slots 76 are provided equally spaced around the circumference of the sleeve member 58, the slots 76 being disposed between the slots 72 in an alternating arrangement. The slots 76 are dimensioned the same as the slots 72, being 1/16 inches wide and having a longitudinal length of 1 7/16 inches from the rear end of the sleeve member 58.

Furthermore, the inner diameter of the rear end portion of the sleeve 58 is tapered outwardly towards the rear end thereof to increase the diameter of the opening 70 as it approaches the rear end so that the tapered walls 78 of the opening 70, which are separated apart by the slots 76, can coact with the tapered outer walls of the lock member 56 in a wedging engagement, as set forth below. The inner diameter of the rear portion of the sleeve member 58 is tapered at approximately 10° for approximately ⅝ inches from the rear end of the sleeve member 58 so that the inner diameter of the tapered walls 78 has a maximum inner diameter of 1.480 inches at the rear end of the sleeve member 58, which is similar to the tapered walls 74. It is noted, that the tapered walls 78 matingly match the outside taper of the lock member 56.

Accordingly, in use, the lock member 56 and the associated sleeve member 58 are placed on the collet 12 in the same manner as the above-mentioned lock member 18 and sleeve member 20, and then the assembled spindle work stop is inserted into the open end of the spindle 54 as mentioned above. Accordingly, when the nut 16 is tightened, in addition to the pin 62 engaging in the groove 36 of the collet 12 to prevent rotation of the collet 12, and also in addition to the tapered front end portion 26 of the collet 12 wedging against the tapered walls 74 of the sleeve opening 70 in the manner mentioned above, the tapered outer walls of the lock member 56 also wedges against the internal tapered walls 78 in the rear portion of the opening 70 of the sleeve member 58 so that the rear end portion of the sleeve member 58 is expanded, due to the slots 76 therein, into engagement with the interior walls of the spindle 54 at the opened end of the spindle 54 to provide a secure engagement therebetween.

Thus, the sleeve member 58 is secured within the spindle 54 by two wedging engagements, the first wedging engagement being at the front end portion of the sleeve member 58 and the second wedging engagement being at the rear end portion of the sleeve member 58. Furthermore, the wedging engagement of the lock member 56 also functions to maintain the lock member 56 in a stationery position relative to the sleeve member 58 and the spindle 54, so that the pin 62 of the lock member 56 is also held stationery in the groove 36 of the collet 12 to prevent the collet 12 from rotating when being drawn in by the tightening of the nut 16.

FIGS. 10 and 11 show a further modified sleeve member 80 which is similar to the above-mentioned sleeve member 20, including an elongated cylindrical hollow body member 82, an enlarged flange 84 on the rear end portion thereof, an opening 86 extending longitudinally therethrough, four slots 88 extending longitudinally through the front end thereof and being transversely extended into communication with the opening 86, and the inner diameter of the front end portion being tapered outwardly towards the front end thereof to increase the diameter of the opening 86 as it approaches the front end to provide internal tapered walls 90 in the front portion of the opening 86, where the sleeve member 80 is preferably fabricated from an elastometric material such as an acetal plastic, commercially known by the trade name Delrin as mentioned above. The dimensions of the above described parts of the sleeve member 80 are approximately the same as the like parts of the above-mentioned sleeve member 20, except the sleeve member 80 is made longer by approximately the same amount as the above-mentioned width of the lock member 18, approximately ¼ inch, in that the lock member 18 can now be eliminated, as set forth below, where the increased length of the sleeve member 80 provides for the engagement of the nut 16 against the flange 84 of the sleeve member 80 when mounted on the collet 12.

The sleeve member 80 is modified to include a rib 92 extending forwardly within the opening 86 from the rear end of the sleeve member 80 to approximately the rear end of one of the slots 88, where the rib 92 extends inwardly from the internal wall of the opening 86 toward the longitudinal axis of the sleeve member 80. The rib 92 has a width approximately equal to the diameter of the above-mentioned reduced end portion 42 of the pin 38, approximately 1/16 inch, which is similar to the width of the slots 88. Accordingly, the rib 92 extends inwardly approximately 0.057 inches transversely into the opening 86, similar to the reduced diameter end portion 42 of the pin 38.

Thus, the above-mentioned lock member 18 is not required and can be eliminated, in that the rib 92 of the sleeve member 80 is inserted into the groove 36 of the collet 12 in the assembly thereof to function in the same manner as the above-mentioned lock member 18, where no further explanation thereof is thought necessary.

It is noted, that a smaller version of this invention, as mentioned above, would work well on hollow drawn tubes for collets.

Numerous alterations of the structures herein discussed will suggest themselves to those skilled in the art. However, it is to be understood that the present disclosure relates to preferred embodiments of the invention which are for purposes of illustration only, and are not to be construed as a limitation of the invention.

What is claimed is:
1. A spindle work stop comprising:
 a collet including an elongated cylindrical body member having an externally threaded rear end portion, a tapered front end portion tapering outwardly towards a front end thereof, an opening extending longitudinally through said collet, slot means extending transversely through at least said front end portion in communication with said opening to divide said front end portion into separated compressable portions, and an external groove extending longitudinally through said threaded rear end portion and an adjacent portion of said body member;

a rod inserted in said opening of said collet, said rod being in engagement with said compressable portions of said front end portion;

a nut having an internally threaded opening to receive said threaded rear end portion, said nut being threadedly engaged on said threaded rear end portion;

locking means disposed in said groove of said collet to prevent said collet from rotating when said nut is being threadedly rotated on said threaded rear end portion; and sleeve means receiving said collet therein so that when said sleeve means and collet are inserted into an open end of a spindle of a lathe, and when said nut is rotated on said threaded rear end portion to a tightened position to draw said collet rearwardly, said tapered front end portion of said collet is wedged against said sleeve means to squeeze said compressable portions of said front end portion against said rod to fix said rod relative to said collet, and also to expand said sleeve means against inner walls of the spindle to fix both said sleeve means and said collet relative to the spindle and to each other.

2. A spindle work stop according to claim 1, wherein said locking means includes a lock member having an opening therethrough to receive said collet, said lock member being disposed on said collet between said nut and said sleeve means, said lock member including a pin disposed in said groove of said collet.

3. A spindle work stop according to claim 2, wherein said lock member is tapered inwardly from a rear end to a front end to provide a wedge engagement with said sleeve means to expand said sleeve means against the inner walls of the spindle at the open end of the spindle.

4. A spindle work stop according to claim 1, wherein said locking means is a rib extending inwardly from an internal wall of said sleeve means at a rear portion of said sleeve means and being positioned in said groove of said collet.

5. A spindle work stop according to claim 1, wherein said sleeve means is a sleeve member including a body member having an opening extending longitudinally therethrough, an inner diameter of a front end portion of said sleeve body member being tapered outwardly towards a front end of said sleeve body member to wedge against said tapered front end portion of said collet.

6. A spindle work stop according to claim 5, wherein said front end portion of said sleeve body member has at least one longitudinally extending slot therein in communication with said sleeve body member opening to permit said front end portion of said sleeve body member to expand against the inner walls of the spindle.

7. A spindle work stop according to claim 5, wherein an inner diameter of a rear end portion of said sleeve body member is tapered outwardly towards a rear end of said sleeve body member to wedge against a tapered portion of said locking means to expand said sleeve rear end portion against the inner walls of the spindle at the open end of the spindle.

8. A spindle work stop according to claim 7, wherein said rear end portion of said sleeve body member has at least one longitudinally extending slot therein in communication with said sleeve body member opening to permit said rear end portion of said sleeve body member to expand against the inner walls of the spindle at the open end of the spindle.

9. A spindle work stop according to claim 8, wherein a flange is provided o said rear end portion of said sleeve body member at said rear end of said sleeve body member to prevent said sleeve member from being drawn into the spindle when said nut is tightened, said slots extending through said flange.

10. A spindle work stop according to claim 8, wherein said front end portion of said sleeve body member has at least one longitudinally extending slot therein in communication with said sleeve body member opening to permit said front end portion of said sleeve body member to expand against the inner walls of the spindle.

11. A spindle work stop according to claim 10, wherein said slots in said front end portion of said sleeve body member are disposed between said slots in said rear end portion of said sleeve body member in an alternating arrangement.

12. A spindle work stop according to claim 5, wherein said locking means includes a lock member having an opening therethrough to receive said collet, said lock member being disposed on said collet between said nut and said sleeve member, said lock member including a pin disposed in said groove of said collet.

13. A spindle work stop according to claim 12, wherein said lock member is tapered inwardly from a rear end to a front end to provide a wedge engagement with a rear end portion of said sleeve member to expand said rear end portion of said sleeve member against the inner walls of the spindle at the open end of the spindle.

14. A spindle work stop according to claim 5, wherein said locking means is a rib extending inwardly from an internal wall of said opening of said sleeve member at a rear portion of said sleeve member and being positioned in said groove of said collet.

15. A spindle work stop according to claim 5, wherein a flange is provided on a rear end portion of said sleeve body member at a rear end of said sleeve body member to prevent said sleeve member from being drawn into the spindle when said nut is tightened.

16. A spindle work stop according to claim 1, wherein a flange is provided on a rear end portion of said sleeve means to prevent said sleeve means from being drawn into the spindle when said nut is tightened.

17. A spindle work stop according to claim 16, wherein a front end portion of said sleeve means has at least one longitudinally extending slot therein to permit said front end portion of said sleeve means to expand against the inner walls of the spindle.

18. A spindle work stop according to claim 1, wherein a front end portion of said sleeve means has at least one longitudinally extending slot therein to permit said front end portion of said sleeve means to expand against the inner walls of the spindle.

19. A spindle work stop according to claim 18, wherein a rear end portion of said sleeve means has at least one longitudinally extending slot therein to permit said rear end portion of said sleeve means to expand against the inner walls of the spindle at the open end of the spindle.

20. A spindle work stop according to claim 1, wherein said sleeve means is fabricated from an elastomeric material.

* * * * *